US011960228B2

(12) United States Patent
Ohshima

(10) Patent No.: US 11,960,228 B2
(45) Date of Patent: Apr. 16, 2024

(54) FAILURE PREDICTION SERVER, FAILURE PREDICTION SYSTEM, AND IMAGE FORMING APPARATUS

(71) Applicant: Toshiba Tec Kabushiki Kaisha, Tokyo (JP)

(72) Inventor: Masami Ohshima, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/118,668

(22) Filed: Mar. 7, 2023

(65) Prior Publication Data

US 2023/0221670 A1 Jul. 13, 2023

Related U.S. Application Data

(63) Continuation of application No. 17/407,428, filed on Aug. 20, 2021, now Pat. No. 11,619,900.

(51) Int. Cl.
*G03G 15/00* (2006.01)
*G03G 21/16* (2006.01)

(52) U.S. Cl.
CPC ....... *G03G 15/553* (2013.01); *G03G 15/5008* (2013.01); *G03G 15/757* (2013.01); *G03G 21/1647* (2013.01); *G03G 2221/1657* (2013.01)

(58) Field of Classification Search
CPC ............. G03G 15/553; G03G 15/5008; G03G 15/757; G03G 21/1647; G03G 2221/1657; G03G 15/55; G03G 15/04036
See application file for complete search history.

(56) References Cited

U.S. PATENT DOCUMENTS

2009/0319827 A1 12/2009 Nakazato et al.
2019/0308420 A1 10/2019 Yamamoto et al.

FOREIGN PATENT DOCUMENTS

JP 2014-002202 1/2014

OTHER PUBLICATIONS

Non-Final Office Action on U.S. Appl. No. 17/407,428 dated Jun. 2, 2022.
Notice of Allowance on U.S. Appl. No. 17/407,428 dated Dec. 7, 2022.

*Primary Examiner* — Sandra Brase
(74) *Attorney, Agent, or Firm* — Foley & Lardner LLP

(57) ABSTRACT

According to at least one embodiment, a failure prediction server includes an interface, a memory, and a processor. The interface is configured to communicate with equipment including a component that deteriorates over time. The memory is configured to store measurement data acquired from the equipment. The processor is configured to set a monitoring start condition for failure prediction in the corresponding equipment based on the measurement data acquired as initial data from the equipment, accumulate the measurement data acquired from the equipment in the memory after the monitoring start condition is satisfied, and predict a failure of the component based on the measurement data accumulated in the memory.

20 Claims, 7 Drawing Sheets

FAILURE PREDICTION SERVER, FAILURE PREDICTION SYSTEM, AND IMAGE FORMING APPARATUS

CROSS-REFERENCE TO RELATED APPLICATION

This application is a continuation of U.S. patent application Ser. No. 17/407,428, filed on Aug. 20, 2021, the entire contents of which are incorporated herein by reference.

FIELD

Embodiments described herein relate generally to a failure prediction server, a failure prediction system, and an image forming apparatus.

BACKGROUND

In related arts, an image forming apparatus such as a digital multifunction peripheral may predict a failure of a component such as a polygon motor based on a component lifetime estimated from a total drive time or the like. However, in reality, components of individual image forming apparatuses differ in a progress rate of deterioration due to individual differences. Therefore, wasteful cost may be incurred by replacing a part according to the general failure prediction, even though there is a margin for the lifetime of the component. If the component deteriorates and fails earlier than expected, the image forming apparatus cannot be used.

DETAILED DESCRIPTION

In general, according to at least one embodiment, a failure prediction server including an interface, a storage device (e.g., a memory), and a processor is provided. The interface is configured to communicate with equipment including a component that deteriorates over time. The storage device is configured to store measurement data acquired from the equipment, the measurement data communicated via the interface. The processor is configured to set a monitoring start condition for failure prediction in the corresponding equipment based on measurement data acquired as initial data from the equipment, accumulate the measurement data acquired from the equipment in the storage device after the monitoring start condition is satisfied, and predict a failure of the component in the equipment based on the measurement data stored in the storage device.

Hereinafter, an image forming apparatus according to at least one embodiment will be described with reference to the drawings. In each drawing used for the description of the following embodiments, the scale of each part may be changed as appropriate. Each of the drawings used in the description of following embodiments may be omitted in configuration for the sake of explanation.

Figure 1:
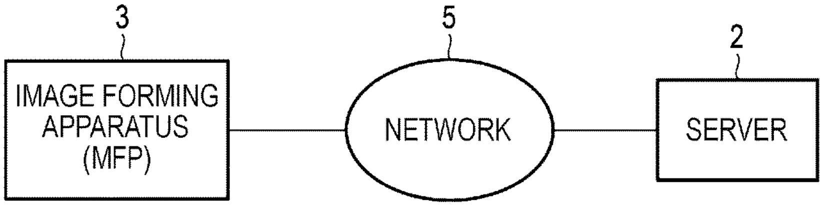
FIG. 1 is a diagram schematically illustrating a configuration example of a failure prediction system according to an embodiment.

FIG. 1 is a diagram illustrating a configuration example of a failure prediction system 1 according to at least one embodiment.

The failure prediction system 1 includes a server (e.g., a failure prediction server) 2 and a digital multifunction peripheral (MFP) 3 as an image forming apparatus. The server 2 is communicatively connected to the MFP 3 via a network 5.

The server 2 as a failure prediction server executes a process of predicting a failure of each part in the MFP 3. The server 2 acquires information for predicting a failure from the target MFP 3. The server 2 sets a condition (e.g., a monitoring start condition) for starting a failure prediction based on initial data acquired from the MFP 3. The server 2 collects data on a part targeted for failure prediction from the MFP for which the monitoring start condition is satisfied. The server 2 predicts a failure at a part targeted for failure prediction by using the data collected from the MFP 3.

The MFP 3 collects various data related to the part targeted for failure prediction. The part targeted for failure prediction is, for example, a polygon motor. However, the part targeted for failure prediction is not limited to the polygon motor, and may be another drive mechanism, a heating mechanism in a fixing device, or the like. The MFP 3 transmits data used for a failure prediction among the collected data to the server 2. The MFP 3 sets the timing to start the failure prediction from the server 2 if the initial data on the part targeted for failure prediction is transmitted. When the timing to start the failure prediction is received, the MFP 3 supplies data on a target part to the server 2.

Next, a configuration of the server 2 in the failure prediction system 1 according to at least one embodiment will be described.

Figure 2:
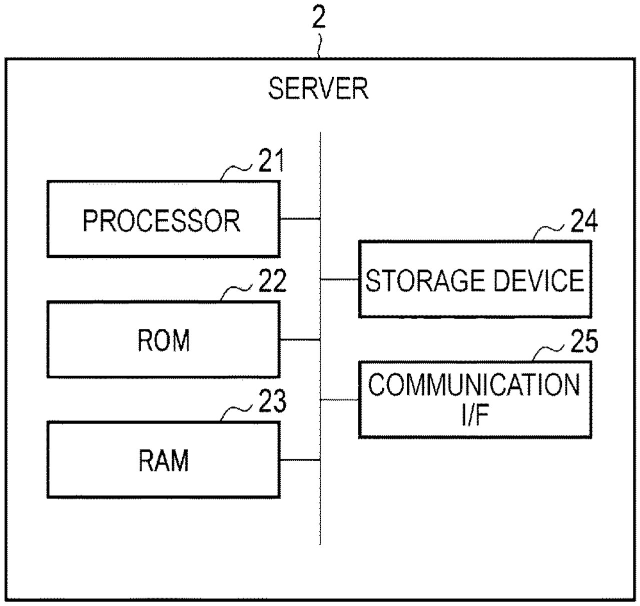
FIG. 2 is a block diagram illustrating a configuration example of a server in the failure prediction system.

FIG. 2 is a block diagram illustrating a configuration example of the server 2 in the failure prediction system 1 according to at least one embodiment.

As illustrated in FIG. 2, the server 2 includes a processor (e.g., a second processor) 21, a read-only memory (ROM) 22, a random access memory (RAM) 23, a storage device (e.g., a second storage device, a memory) 24, a communication interface (I/F) (e.g., a second interface) 25, and the like.

The processor 21 executes a program for executing various processes. The processor 21 is, for example, a CPU. The processor 21 is connected to each part via an internal interface. The processor 21 executes various processes by executing a program stored in the ROM 22 or the storage device 24 using the RAM 23.

The RAM 23 acts as a working memory or a buffer memory. The ROM 22 is a non-volatile memory that cannot be rewritten. The ROM 22 stores a preset program, control data, and the like.

The storage device 24 is a rewritable non-volatile memory. The storage device 24 stores data such as a program, control data, and setting information. The storage device 24 accumulates data for a failure prediction acquired from the MFP 3 targeted for failure prediction. The storage device 24 may store setting information and the like for setting the monitoring start condition. The storage device 24 may store setting information for predicting a failure of a specific part from data acquired from the MFP 3 and the like.

The communication I/F 25 is an interface for communicating with the MFP 3. For example, the communication I/F 25 is configured to communicate with a plurality of MFPs 3 targeted for failure prediction via a network. The communication interface 25 may include an interface for notifying a terminal device owned by a serviceman who executes maintenance of the MFP 3 of a failure prediction result.

Next, a configuration of the MFP 3 including the part targeted for failure prediction in the failure prediction system 1 according to at least one embodiment will be described.

Figure 3:
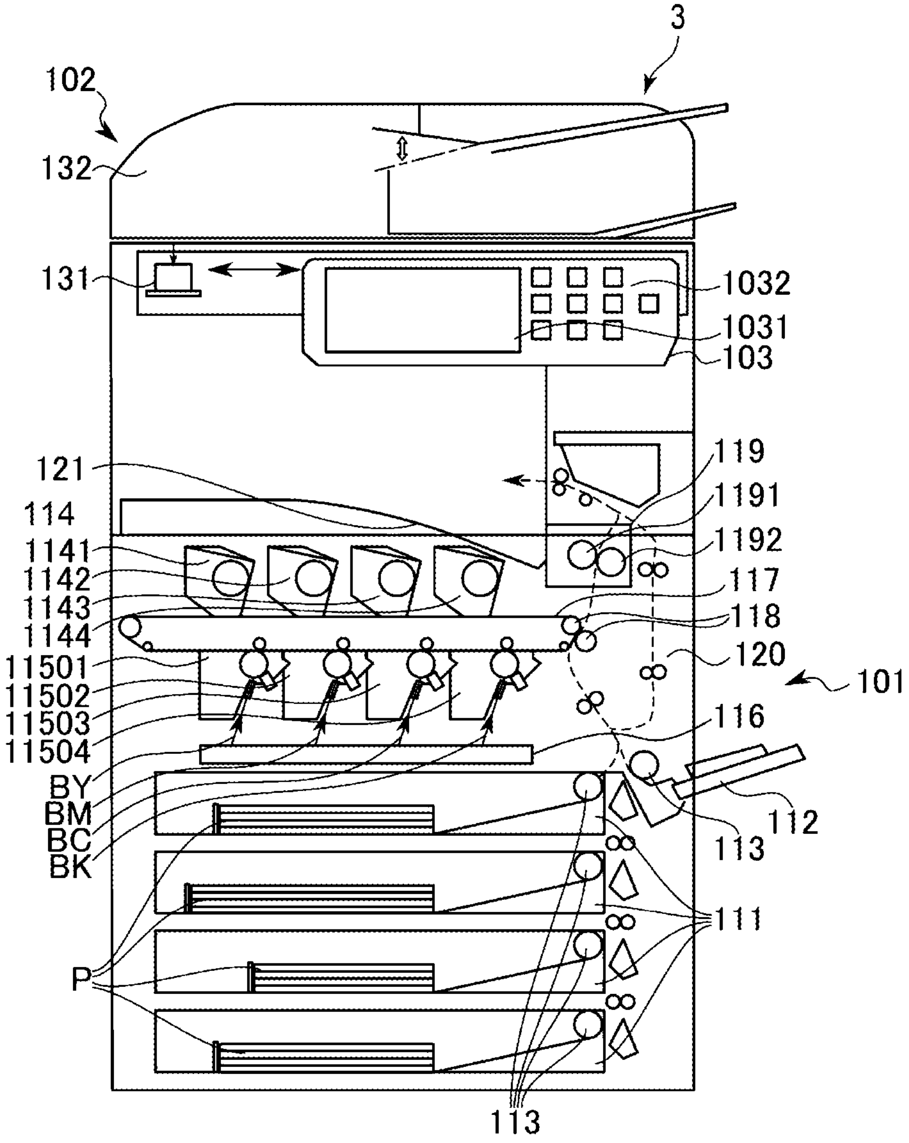
FIG. 3 is a diagram schematically illustrating a configuration example of an image forming apparatus.

FIG. 3 is a diagram illustrating a configuration example of the digital multifunction peripheral (MFP) 3 as the image forming apparatus according to at least one embodiment.

The MFP 3 is an apparatus having functions such as copying, printing, scanning, and facsimile. The MFP 3 includes, for example, a printer 101, a scanner 102, and an operation panel 103. The MFP 3 forms an image on an image forming medium P by the printer 101 using a recording material such as toner. The image forming medium P is, for example, sheet-shaped paper or the like. The MFP 3 reads an image from a document or the like on which an image is formed by the scanner 102. The MFP 3 prints the image read from the document or the like by the printer 101 and the scanner 102 on the image forming medium P.

The printer 101 forms an image on a medium such as paper. The printer 101 includes, for example, a paper feed tray 111, a manual feed tray 112, a paper feed roller 113, a toner cartridge 114, an image forming station 115, an optical scanning device 116, a transfer belt 117, a secondary transfer roller 118, a fixing unit 119 (e.g., a fixing device), and a double-sided unit 120 (e.g., a double-sided device), a paper discharge tray 121.

The paper feed tray 111 accommodates the image forming medium P used for printing. The manual feed tray 112 is a stand for manually feeding the image forming medium P. The paper feed roller 113 rotates by action of the motor to carry out the image forming medium P accommodated in the paper feed tray 111 or the manual feed tray 112 from the paper feed tray 111 or the manual feed tray 112.

The toner cartridge 114 stores the recording material such as toner for supplying the recording material to the image forming station 115. The MFP 3 illustrated in FIG. 3 includes a plurality of toner cartridges 114. The MFP 3 includes four toner cartridges 114 of, for example, a toner cartridge 1143, a toner cartridge 1142, a toner cartridge 1141, and a toner cartridge 1144, as illustrated in FIG. 1.

The toner cartridge 1143 stores a cyan (C) recording material. The toner cartridge 1142 stores a magenta (M) recording material. The toner cartridge 1141 stores a yellow (Y) recording material. The toner cartridge 1144 stores a black (K) recording material.

The color of the recording material stored in the toner cartridge 114 is not limited to each of colors of CMYK, and may be any other color. The recording material stored in the toner cartridge 114 may be a special recording material. For example, the toner cartridge 114 stores a decolorable recording material that is decolored at a temperature higher than a predetermined temperature and becomes invisible.

The MFP 3 includes a plurality of image forming stations 115. In the example illustrated in FIG. 3, the MFP 3 includes four image forming stations 115 of an image forming station 11503, an image forming station 11502, an image forming station 11501, and an image forming station 11504. The image forming station 11503, the image forming station 11502, the image forming station 11501, and the image forming station 11504 each form an image with a recording material corresponding to each of colors of CMYK. That is, the image forming station 11503 forms a cyan image. The image forming station 11502 forms a magenta image. The image forming station 11501 forms a yellow image. The image forming station 11504 forms a black image.

Figure 4:
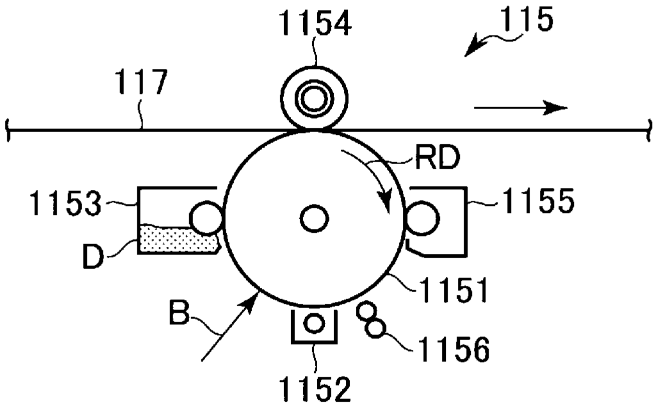
FIG. 4 is a diagram schematically illustrating a configuration example of an image forming station in the image forming apparatus.

The image forming station 115 will be further described using FIG. 4.

FIG. 4 is a schematic diagram schematically illustrating a configuration example of the image forming station 115. The image forming station 115 includes, for example, a photoreceptor drum 1151, a charging unit 1152 (e.g., a charger), a developing unit 1153 (e.g., a developing device), a primary transfer roller 1154, a cleaner 1155, and a destaticizing lamp 1156.

The photoreceptor drum 1151 is hit by a beam B emitted from the optical scanning device 116. With such configuration, an electrostatic latent image is formed on a surface of the photoreceptor drum 1151. The photoreceptor drum may rotate along a rotation direction RD.

The charging unit 1152 charges the surface of the photoreceptor drum 1151 with a predetermined positive charge.

The developing unit 1153 develops the electrostatic latent image on the surface of the photoreceptor drum 1151 using a recording material D supplied from the toner cartridge 114. With such configuration, an image formed by the recording material D is formed on the surface of the photoreceptor drum 1151.

The primary transfer roller 1154 is disposed at a position facing the photoreceptor drum 1151 with the transfer belt 117 in between. The primary transfer roller 1154 generates a transfer voltage between the primary transfer roller 1154 and the photoreceptor drum 1151. With such configuration, the primary transfer roller 1154 transfers (primary transfer) the image formed on the surface of the photoreceptor drum 1151 onto the transfer belt 117 in contact with the photoreceptor drum 1151.

The cleaner 1155 removes the recording material D remaining on the surface of the photoreceptor drum 1151. The destaticizing lamp 1156 removes electric charges remaining on the surface of the photoreceptor drum 1151.

The optical scanning device 116 is also called a laser scanning unit (LSU) (e.g., a laser scanner) or the like. The optical scanning device 116 controls the beam B according to input image data based on the control by the processor 141 to form an electrostatic latent image on the surface of the photoreceptor drum 1151 of each image forming station 115. The image data input here is, for example, image data read from the document or the like by the scanner 102. Alternatively, the image data input here is image data transmitted from another device or the like and received by the MFP 3.

The beam B emitted by the optical scanning device 116 to the image forming station 11501 is referred to as a beam BY, the beam B emitted by the optical scanning device 116 to the image forming station 11502 is referred to as a beam BM, the beam B emitted by the optical scanning device 116 to the image forming station 11503 is referred to as a beam BC, and the beam B emitted by the optical scanning device 116 to the image formation station 11504 is referred to as a beam BK. Accordingly, the optical scanning device 116 controls the beam BY according to a yellow (Y) component of image data. The optical scanning device 116 controls the beam BM according to a magenta (M) component of the image data. The optical scanning device 116 controls the beam BC according to a cyan (C) component of the image data. The optical scanning device 116 controls the beam BK according to a black (K) component of the image data. The optical scanning device 116 will be further described later.

The transfer belt 117 is, for example, an endless belt, which can be rotated by the action of a roller. The transfer belt 117 rotates to convey the image transferred from each image forming station 115 to a position of the secondary transfer roller 108.

The secondary transfer roller 118 includes two rollers facing each other. The secondary transfer roller 118 transfers (secondary transfer) the image formed on the transfer belt 117 onto the image forming medium P passing between the secondary transfer rollers 118.

The fixing unit 119 heats and pressurizes the image forming medium P on which the image is transferred. With such configuration, the image transferred onto the image forming medium P is fixed. The fixing unit 119 includes a heating unit 1191 (e.g., a heater) and a pressure roller 1192 facing each other.

The heating unit 1191 is, for example, a roller provided with a heat source for heating the heating unit 1191. The heat source is, for example, a heater. The roller heated by the heat source heats the image forming medium P. The pressure roller 1192 pressurizes the image forming medium P passing between the pressure roller 1192 and the heating unit 1191.

The heating unit 1191 may include an endless belt suspended on a plurality of rollers. For example, the heating unit 1191 includes a plate-shaped heat source, an endless belt, a belt conveyance roller, a tension roller, and a press roller. The endless belt is, for example, a film-shaped member. The belt conveyance roller drives the endless belt. The tension roller applies tension to the endless belt. An elastic layer is formed on the surface of the press roller. In the plate-shaped heat source, a heat generating portion side comes into contact with the inside of the endless belt and is pressed in the direction of the press roller to form a fixing nip having a predetermined width between the plate-shaped heat source and the press roller. Since the plate-shaped heat source heats while forming a nip region, responsiveness during energization is higher than that of a heating system using a halogen lamp.

The double-sided unit 120 brings the image forming medium P into a state in which printing on a back surface is possible. For example, the double-sided unit 120 reverses the front and back of the image forming medium P by switching back the image forming medium P using a roller or the like.

The paper discharge tray 121 is a stand on which the printed image forming medium P is discharged.

The scanner 102 is a device that reads an image of the document. The scanner 102 is a scanner of an optical reduction system including an image sensor such as a charge-coupled device (CCD) image sensor. Alternatively, the scanner 102 is a scanner of a contact image sensor (CIS) system including an image sensor such as a complementary metal-oxide-semiconductor (CMOS) image sensor. Alternatively, the scanner 102 may be a scanner of another known system. The scanner 102 reads an image from the document or the like. The scanner 102 includes a reading module 131 and a document feeder 132.

The reading module 131 converts incident light into a digital signal by the image sensor. With such configuration, the reading module 131 reads the image from a front surface of the document.

The document feeder 132 is also called, for example, an auto document feeder (ADF). The document feeder 132 conveys the documents placed on the document tray one after another. The image on the conveyed document is read by the scanner 102. The document feeder 132 may include a scanner for reading an image from a back surface of the document. The surface on which the image can be read by the scanner 102 is the front surface.

The operation panel 103 includes a man-machine interface for input and output between the MFP 3 and an operator of the MFP 3. The operation panel 103 includes, for example, a touch panel 1031 and an input device 1032.

The touch panel 1031 is formed by stacking a display such as a liquid crystal display or an organic EL display and a pointing device driven by touch input on each other. The display in the touch panel 1031 functions as a display device for displaying a screen for notifying the operator of the MFP 3 of various information. The touch panel 1031 functions as an input device that receives a touch operation by the operator.

The input device 1032 receives an operation by the operator of the MFP 3. The input device 1032 is, for example, a keyboard, keypad, or touchpad.

Next, a configuration of the control system in the MFP 3 as the image forming apparatus according to at least one embodiment will be described.

Figure 5:
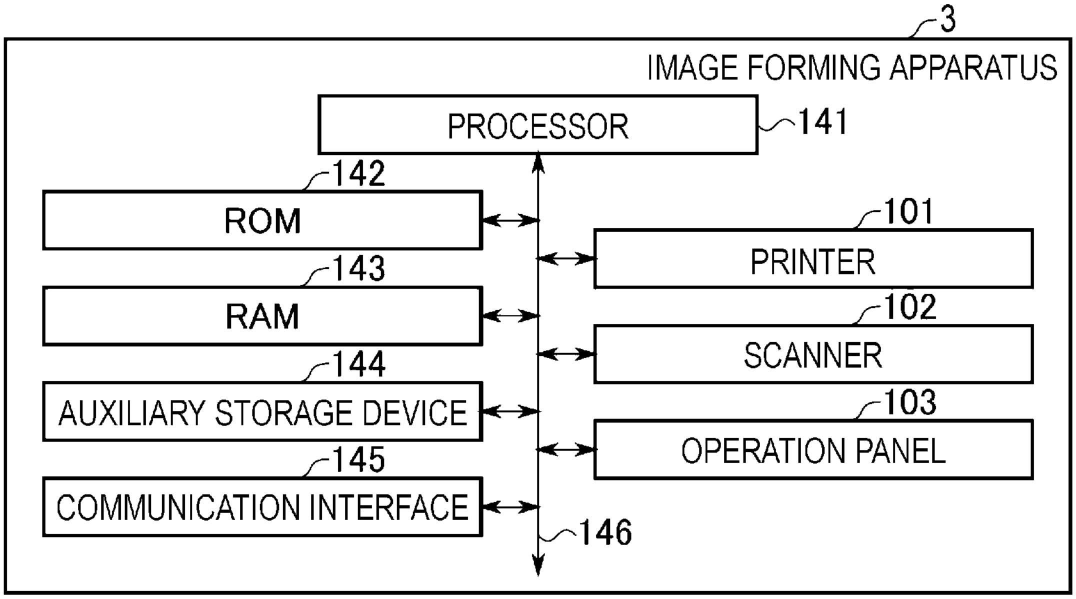
FIG. 5 is a block diagram illustrating a configuration example of a control system in the image forming apparatus.

FIG. 5 is a block diagram illustrating a configuration example of a control system in the MFP 3 as the image forming apparatus according to at least one embodiment.

The MFP 3 includes, for example, a processor (e.g., a first processor) 141, a read-only memory (ROM) 142, a random-access memory (RAM) 143, an auxiliary storage device (e.g., a first storage device, a memory) 144, and a communication interface (e.g., a first interface) 145, the printer 101, the scanner 102, the operation panel 103. The processor 141 is connected to each part via a bus 146 or the like.

The processor 141 corresponds to a central part of a computer that performs processing such as computation and control needed for the operation of the MFP 3. The processor 141 controls each part in order to realize various functions of the MFP 3 based on a program such as system software, application software, and firmware stored in the ROM 142, the auxiliary storage device 144 or the like.

Part or all of the program may be incorporated in the circuit of the processor 141. The processor 141 is, for example, a central processing unit (CPU) (e.g., a central processor), a micro processing unit (MPU) (e.g., a microprocessor), a system on a chip (SoC), a digital signal processor (DSP), a graphics processing unit (GPU) (e.g., a graphics processor), an application specific integrated circuit (ASIC), a programmable logic device (PLD), a field-programmable gate array (FPGA), and the like. Alternatively, the processor 141 is a combination of a plurality of such components.

The ROM 142 corresponds to a main memory of a computer including the processor 141 as a central part thereof. The ROM 142 is a non-volatile memory used exclusively for reading data. The ROM 142 stores, for example, firmware and the like among the programs described above. The ROM 142 also stores data or various set values used by the processor 141 for performing various processes.

The RAM 143 corresponds to a main memory of the computer including the processor 141 as a central part thereof. The RAM 143 is a memory used for reading and writing data. The RAM 143 is used as a so-called work area or the like for storing data temporarily used by the processor 141 for performing various processes. The RAM 143 is, for example, a volatile memory.

The auxiliary storage device 144 corresponds to an auxiliary storage device of the computer including the processor 141 as a central part thereof. The auxiliary storage device 144 is, for example, an electric erasable programmable read-only memory (EEPROM), a hard disk drive (HDD), a flash memory, or the like. The auxiliary storage device 144 stores, for example, system software, application software, and the like among the programs described above. The auxiliary storage device 144 stores data used by the processor 141 for performing various processes, data generated by the processes of the processor 141, various setting values, and the like. The MFP 3 may include an interface into which a storage medium, such as a memory card or a universal serial bus (USB) memory, can be inserted as the auxiliary storage device 144. The interface reads and writes information from and to the storage medium.

The communication interface 145 is an interface for the MFP 3 to communicate with the server 2 via a network or the like.

The bus 146 includes a control bus, an address bus, a data bus, and the like, and transmits signals sent and received between the parts of the MFP 3.

Next, the optical scanning device 116 in the MFP 3 as the image forming apparatus will be further described.

Figure 6:
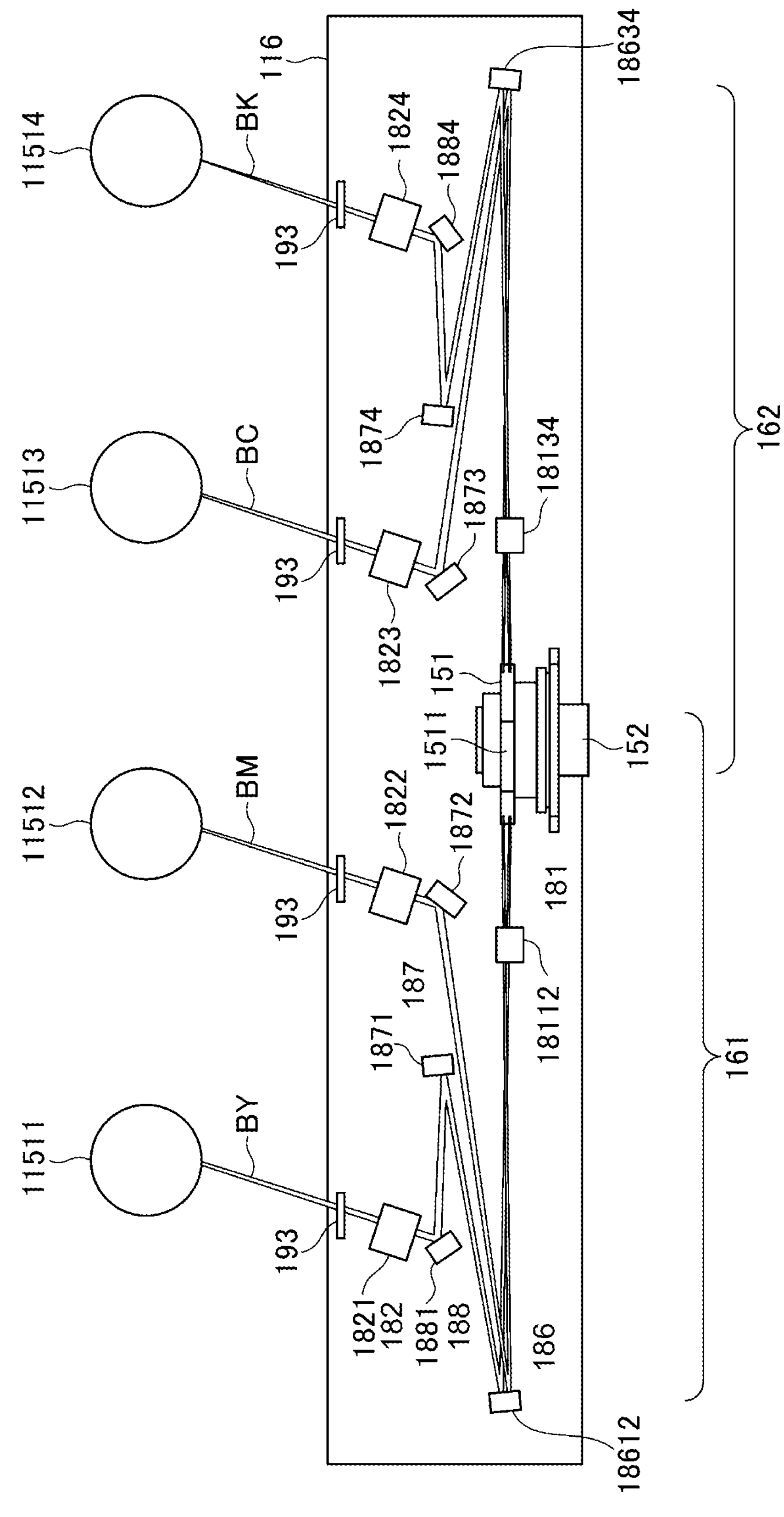
FIG. 6 is a diagram illustrating a configuration example of an optical scanning device in the image forming apparatus.
Figure 7:
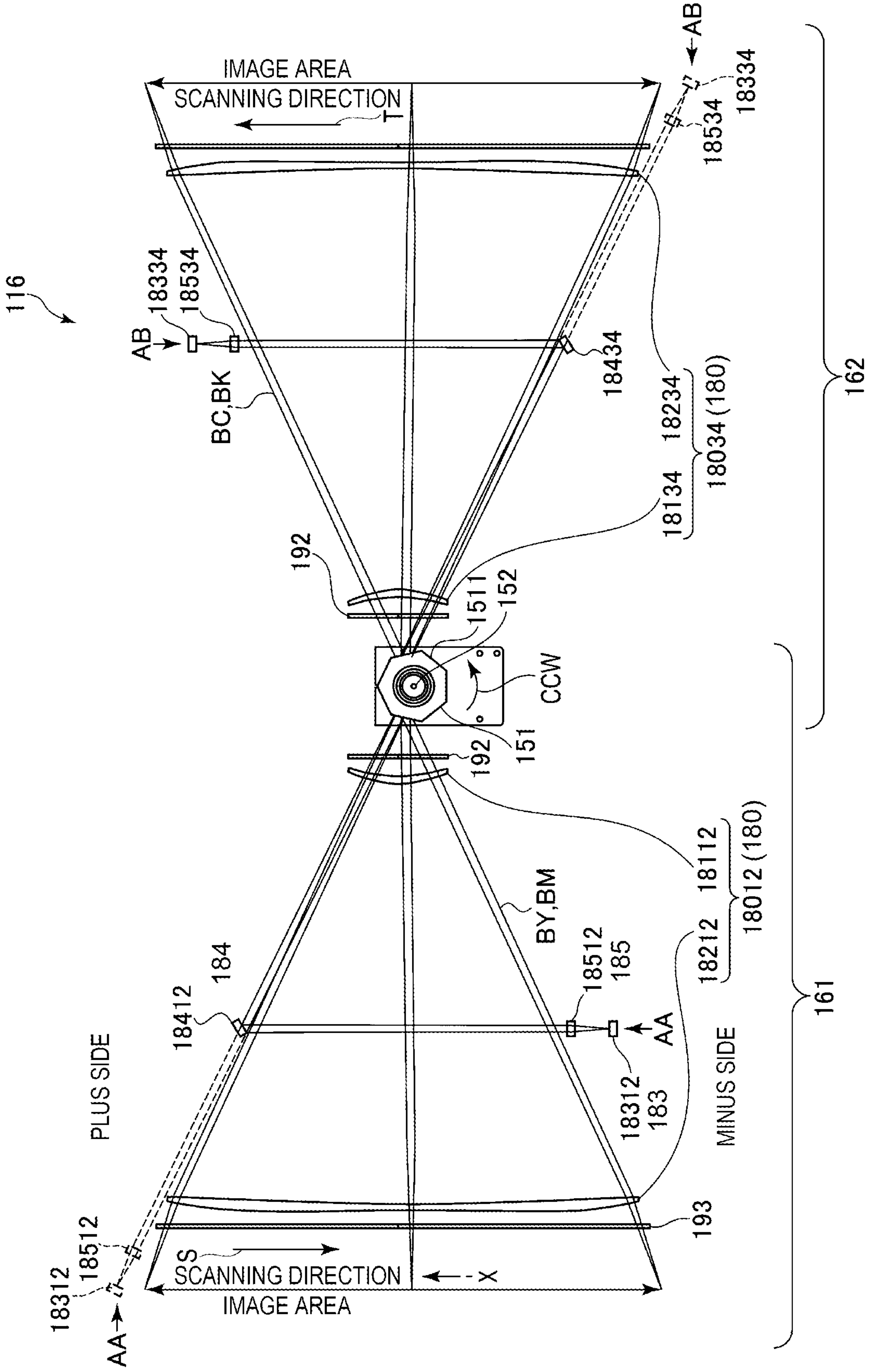
FIG. 7 is a plan view of an example of an optical system, which is deployed on a plane, of the optical scanning device.

FIG. 6 is a diagram illustrating a configuration example of the optical scanning device 116. FIG. 7 is a plan view of an example of the optical system, which is deployed on a plane, of the optical scanning device 116.

A polygon mirror 151 is a regular polygonal columnar mirror (deflector) of which each side surface is a reflecting surface 1511 that reflects a beam such as a laser beam. The polygon mirror 151 illustrated in FIG. 6 is a regular heptagonal columnar mirror having seven side surfaces (e.g., the reflection surface 1511). The reflecting surface 1511 in the polygon mirror 151 is continuous along a rotation direction CCW of the polygon mirror 151, and configures an outer peripheral surface of the polygon mirror 151. The polygon mirror 151 is rotatable about a rotation axis parallel to each reflection surface 1511. The rotation axis of the polygon mirror 151 is orthogonal to a rotation axis of each photoreceptor drum 1151.

The polygon motor 152 is an example of a component targeted for failure prediction. The polygon motor 152 rotates the polygon mirror 151 in the rotation direction CCW at a predetermined speed. The rotation axis of the polygon motor 152 and the rotation axis of the polygon mirror 151 are, for example, coaxial. However, the rotation axis of the polygon motor 152 and the rotation axis of the polygon mirror 151 may not be coaxial.

The optical scanning device 116 includes a plurality of light sources that emit a beam such as a laser beam. For example, the optical scanning device 116 includes four light sources. For example, the first light source emits a beam BY corresponding to the Y component. The second light source emits a beam BM corresponding to the M component. The third light source emits a beam BC corresponding to the C component. The fourth light source emits a beam BK corresponding to the K component.

The optical scanning device 116 irradiates the surface of each photoreceptor drum 1151 with a beam such as a laser beam emitted from a light source through an optical path formed by a predetermined scanning optical system.

In the example illustrated in FIGS. 6 and 7, the optical scanning device 116 sets two beams as one set, and one set of scanning optical systems is disposed on each of the left and right sides of the polygon mirror 151. That is, as illustrated in FIGS. 6 and 7, the optical scanning device 116 includes two scanning optical systems of a scanning optical system 161 and a scanning optical system 162, each of which including a plurality of optical elements, on both sides of the single polygon mirror 151 (e.g., the left and right sides in the figure), with the single polygon mirror 151 as a center. The polygon mirror 151 is in each of the scanning optical system 161 and the scanning optical system 162.

The scanning optical system 161 includes a scanning optical system that scans the beam BY and a scanning optical system that scans the beam BM. The scanning optical system 161 reflects the beam BY emitted from the light source and the beam BM emitted from another light source on the same reflecting surface 1511 of the polygon mirror 151 rotating in the rotation direction CCW. With such configuration, the beam BY and the beam BM are deflected in the main scanning direction along the rotation direction CCW, and scan the surfaces of two photoreceptor drums of a photoreceptor drum 11511 and a photoreceptor drum 11512, respectively.

A direction in which each beam B is deflected (e.g., scanned) by the polygon mirror 151 (e.g., circumferential direction of the polygon mirror 151) is defined as a "main scanning direction". A direction orthogonal to the main scanning direction and orthogonal to the optical axis direction of the beam B is defined as a "sub-scanning direction" of the beam B. In FIG. 7, a rotation axis direction of the polygon mirror 151 is the sub-scanning direction. In FIG. 7, a direction orthogonal to the rotation axis direction of the polygon mirror 151 and orthogonal to the optical axis direction of the beam B is the main scanning direction of the beam B.

The scanning optical system 162 includes a scanning optical system that scans the beam BC and a scanning optical system that scans the beam BK. The scanning optical system 162 reflects the beam BC emitted from the light source and the beam BK emitted from another light source on the same reflecting surface 1511 of the polygon mirror 151 rotating in the rotation direction CCW. With such configuration, the beam BC and the beam BK are deflected in the main scanning direction along the rotation direction CCW, and scan the surfaces of the two photoreceptor drums of a photoreceptor drum 11513 and a photoreceptor drum 11514, respectively.

Next, a post-deflection optical system 180 will be described. The post-deflection optical system 180 guides the beam B reflected by the reflecting surface 1511 to the surface of the photoreceptor drum 1151. The optical scanning device 116 includes two post-deflecting optical systems 180 of a post-deflecting optical system 18012 and a post-deflecting optical system 18034. The post-deflection optical system 180 includes an fθ lens 181, an fθ lens 182, a photodetector 183, a folding mirror 184, an optical path correction element 185, folding mirrors 186 to 188, an optical element 192, and an optical element 193. In the example illustrated in FIG. 6, the post-deflection optical system 180 includes two folding mirrors 186 of a folding mirror 18612 and a folding mirror 18634. In the example illustrated in FIG. 6, the post-deflection optical system 180 includes four folding mirrors 187 of a folding mirror 1871, a folding mirror 1872, a folding mirror 1873, and a folding mirror 1874. In the example illustrated in FIG. 6, the post-deflection optical system 180 includes two folding mirrors 188 of a folding mirror 1881 and a folding mirror 1884.

The fθ lens 181 and the fθ lens 182 are a set of two image forming lenses that optimizes a shape and position of the beam B deflected (scanned) by the polygon mirror 151 on an image plane.

The fθ lens 181 on the upstream side near the polygon mirror 151 is on the optical path of a set of two beams B. The set of two beams B passes through the same fθ lens 181. For example, an fθ lens 18112 is located on the optical path of the beam BY and on the optical path of the beam BM. The beam BY and the beam BM pass through the fθ lens 18112.

The fθ lens 182 on the downstream side near the photoreceptor drum 1151 is illustrated in FIG. 7 for each post-deflecting optical system 180. However, one fθ lens 182 is independently provided in each optical path of each beam B. In the example illustrated in FIG. 6, the post-deflection optical system 180 includes four lenses 182 of a lens 1821, a lens 1822, a lens 1823, and a lens 1824. In the example illustrated in FIG. 7, the post-deflection optical system 180 includes two lenses 182 of a lens 18212 and a lens 18234.

The photodetector 183 is located upstream of the scanning start of beam B (e.g., scanning position AA and scanning position AB). The beam B is reflected by the folding mirror 184 and folded back. However, in FIG. 7, in order to make the fact that the scanning position AA and the scanning position AB are upstream of the scanning start portion to be easy to understand, the beam B drawn without being folded back is also illustrated by a broken line. In FIG. 7, the photodetector 183 and the optical path correction element 185 on which the beam B drawn without being folded back are also illustrated by a broken line. The photodetector 183 is provided to match horizontal synchronization of the beam B.

A photodetector 18312 detects the incident beam BY and beam BM. A photodetector 18334 detects the incident beam BC and beam BK. The photodetector 183 is an example of a photodetection portion.

The folding mirror 184 is on the optical path from the fθ lens 181 toward the photodetector 183. The folding mirror 184 reflects the beam B to fold back the beam B toward the photodetector 183. However, in FIG. 7, the optical path of the beam B, the photodetector 183 on the optical path, the folding mirror 184, and an optical path correction element 185 deployed on a plane.

A folding mirror 18412 reflects the beam BY and the beam BM. The folding mirror 18434 reflects the beam BC and the beam BK.

The optical path correction element 185 is a lens on the optical path between the folding mirror 184 and the photodetector 183. The optical path correction element 185 guides the beam B reflected by the folding mirror 184 onto a detection surface of the photodetector 183.

For example, the beam BY and the beam BM are reflected by the polygon mirror 151, pass through the fθ lens 18112, the folding mirror 18412, and an optical path correction element 18512, and then incident on the photodetector 18312. That is, the beam BY and the beam BM are reflected by the polygon mirror 151, pass through a common optical element (e.g., the lens and mirror), and are incident on the common photodetector 18312.

The beam BC and the beam BK are reflected by the polygon mirror 151, pass through an fθ lens 18134, a folding mirror 18434, and an optical path correction element 18534, and then incident on a photodetector 18334. That is, the beam BC and the beam BK are reflected by the polygon mirror 151, pass through the common optical element (lens and mirror), and are incident on the common photodetector 18334.

Hereinafter, an action of the failure prediction system 1 according to at least one embodiment will be described.

First, a flow of failure prediction for the component of the MFP 3 in the failure prediction system 1 according to at least one embodiment will be schematically described.

First, the server 2 of the failure prediction system 1 sets a condition for starting failure prediction from data (e.g., initial data) immediately after the start of use of each part in the MFP 3 targeted for failure prediction. The server 2 acquires initial data from the MFP 3 and stores the acquired initial data in the memory. The server 2 specifies the condition for starting failure prediction (e.g., the monitoring start condition) based on the result of analyzing the initial data acquired from a target MFP and data collected from other MFPs. The server 2 sets the monitoring start condition in MFP 3.

After the monitoring start condition is satisfied, the MFP 3 periodically transmits data for the failure prediction for a target part to the server 2. The server 2 accumulates the data acquired from the MFP 3 for which the monitoring start condition is satisfied. The server 2 individually determines the failure prediction of the part in the MFP 3 by analyzing a change in the data collected from the MFP 3. For example, the server 2 predicts that a failure is imminent if the server 2 detects a data change pattern similar to a data change pattern that is about to cause a failure due to deterioration over time.

Next, the action of the MFP 3 as the image forming apparatus in the failure prediction system 1 according to at least one embodiment will be described in detail.

Figure 8:
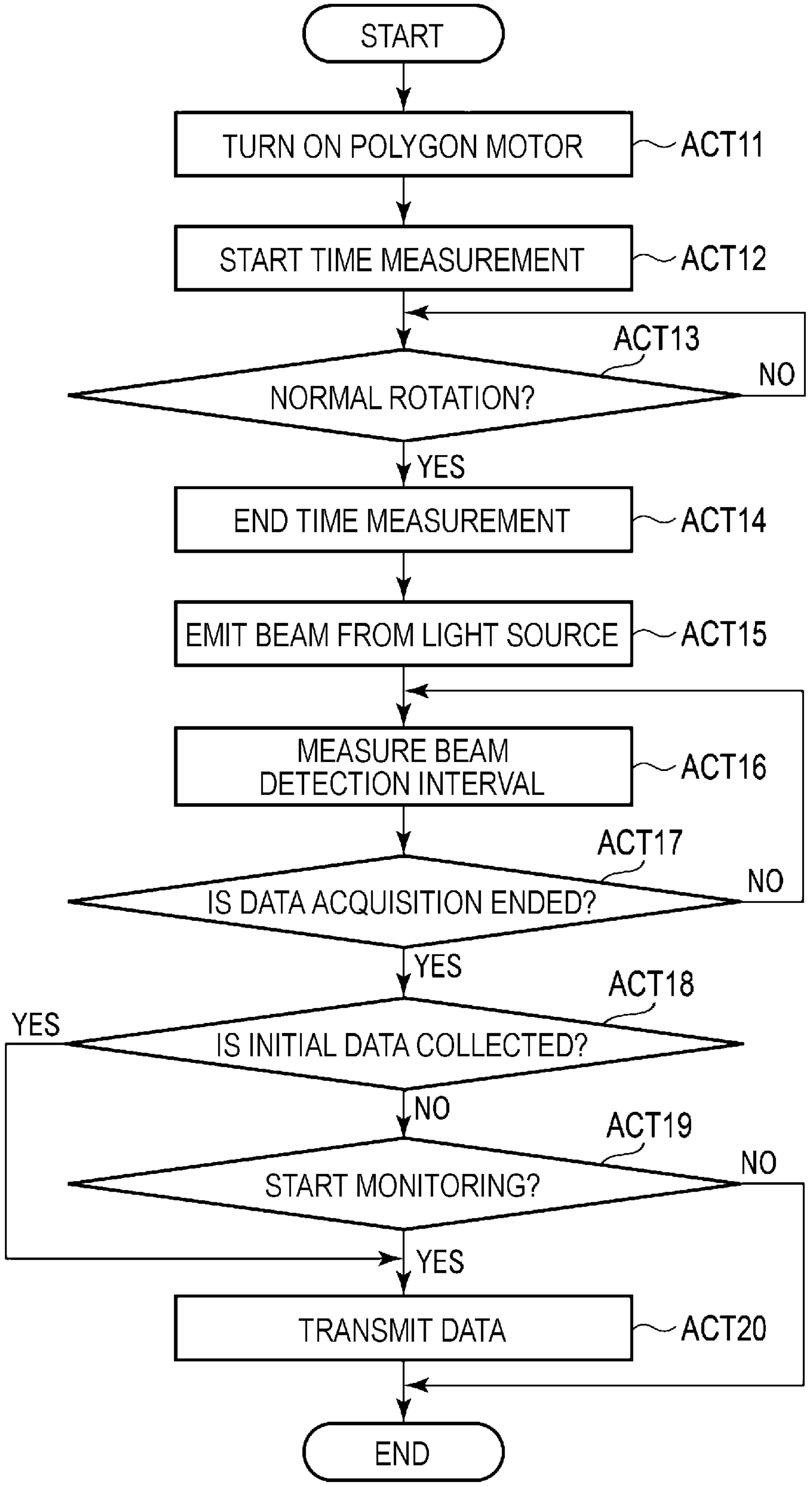
FIG. 8 is a flowchart for describing an action of an MFP as the image forming apparatus in the failure prediction system.

FIG. 8 is a flowchart for describing the action of the MFP 3 in the failure prediction system 1 according to at least one embodiment.

Here, as an example, the action of the MFP 3 if the target part for the failure prediction is the polygon motor 152 will be described.

The processor 141 of the MFP 3 acquires data (e.g., measurement data) indicating an acting state of the polygon motor 152 at a predetermined timing. The measurement data is desirably acquired with the polygon motor 152 acting under the same conditions. The processor 141 acquires the measurement data at the timing when the polygon motor can act under the same conditions. For example, the processor 141 acquires measurement data indicating an acting state of the polygon motor immediately after the main power source of the MFP 3 is turned ON. The processor 141 may acquire measurement data indicating the acting state of the polygon motor 152 if the MFP 3 is restored from the sleep state.

When acquiring the measurement data of the polygon motor 152, the processor 141 first turns ON the polygon motor 152 (ACT 11). The processor 141 starts measuring the time when the polygon motor 152 is turned ON (ACT 12).

The processor 141 monitors the timing at which the rotation of the polygon motor 152 becomes a normal state (normal rotation) after the polygon motor 152 is turned ON (ACT 13). For example, the processor 141 determines that the polygon motor 152 reaches the normal rotation if the rotation speed of the polygon motor 152 stabilizes at a predetermined rotation speed. The processor 141 ends measuring the time when the polygon motor 152 reaches the normal rotation (ACT 14). With such configuration, the processor 141 measures the time until the polygon motor 152 reaches the normal rotation.

After the polygon motor 152 is in normal rotation, the processor 141 acquires information indicating stability of the polygon motor 152. The processor 141 causes a beam to be emitted from a light source in the optical scanning device 116 (ACT 15). The beam emitted from the light source is reflected by the polygon mirror 151 rotated by the polygon motor 152. The beam reflected by the polygon mirror 151 is detected by the photodetector 183 disposed at a predetermined position. The processor 141 measures an interval at which the photodetector 183 detects the beam (e.g., beam detection interval) in a state where the beam is emitted from the light source (ACT 16). The processor 141 continuously executes the measurement of the beam detection interval until a predetermined amount of data can be acquired (NO in ACT 17).

If the measurement of the beam detection interval is ended (YES in ACT 17), the processor 141 sets the time from the start of driving to the normal rotation and the beam detection interval as the measurement data of the polygon motor 152. The processor 141 stores the acquired measurement data of the polygon motor 152 in the auxiliary storage device 144.

If the measurement data is acquired, the processor 141 determines whether to upload the acquired measurement data to the server 2 as the initial data of the polygon motor 152 (ACT 18). For example, the processor 141 uploads the measurement data as the initial data to the server 2 for a predetermined number of times (for example, about 10 to 20 times) after starting to use the polygon motor 152. If the acquired measurement data is used as the initial data (NO in ACT 18), the processor 141 transmits the measurement data as the initial data to the server 2 by the communication interface 145 (ACT 20).

If the acquired measurement data are not used as the initial data (NO in ACT 18), that is, if the transmission of the measurement data as the initial data is ended, the processor 141 determines whether the monitoring start condition is satisfied (ACT 19). The monitoring start condition is set by the server 2 in the MFP 3 based on the initial data. The monitoring start condition is set considering the deterioration over time of the polygon motor 152 estimated from the initial data of the polygon motor 152 of the MFP 3.

If the monitoring start condition is satisfied (YES in ACT 19), the processor 141 transmits the measurement data as data for failure prediction to the server 2 by the communication interface 145 (ACT 20). If the monitoring start condition is not satisfied (NO in ACT 19), the processor 141 ends a series of processing for acquiring measurement data.

According to the process described above, the MFP as the image forming apparatus omits the process of sending the measurement data for predicting the failure of the polygon motor to the server until the monitoring start condition is satisfied. With such configuration, wasteful data transmission from the MFP to the server can be prevented, and the network load can be reduced.

Next, the action of the server 2 as the failure prediction server in the failure prediction system 1 according to at least one embodiment will be described in detail.

Figure 9:
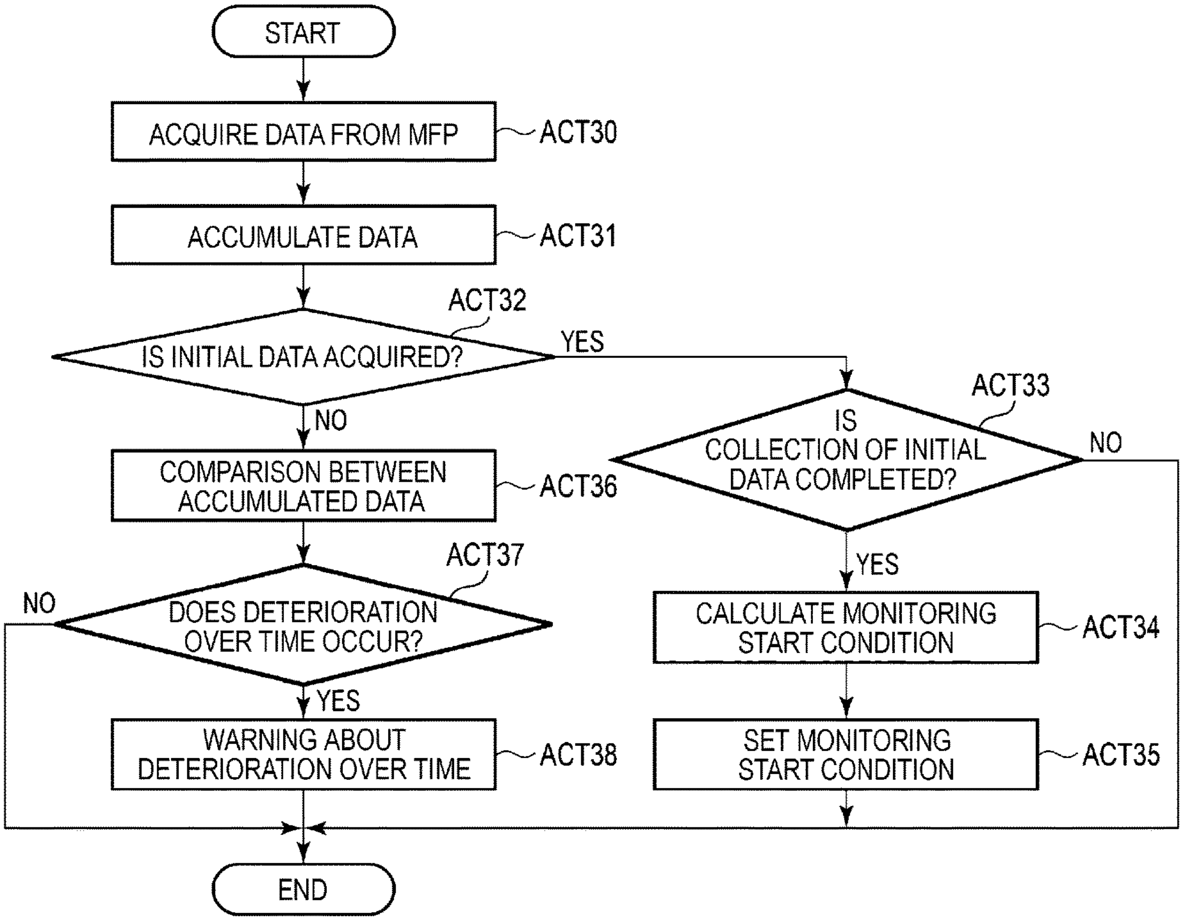
FIG. 9 is a flowchart for describing an action example of the server in the failure prediction system.

FIG. 9 is a flowchart for describing an action example of the server 2 in the failure prediction system 1 according to at least one embodiment.

Here, the action of the server 2 if the part targeted for failure prediction is the polygon motor 152 will be described, corresponding to the action example illustrated in FIG. 8.

The processor 21 of the server 2 acquires the measurement data on the part targeted for failure prediction from the MFP 3 targeted for failure prediction by the communication interface 25 (ACT 30). For example, the processor 21 acquires the measurement data of the polygon motor 152 as described above from the MFP 3. If the measurement data is acquired, the processor 21 accumulates the acquired measurement data in the storage device 24 (ACT 31). For example, the processor 21 stores the measurement data in the storage device 24 for each MFP 3 of a transmission source.

If the measurement data from the MFP 3 is acquired, the processor 21 determines whether the acquired measurement data is initial data (ACT 32). If the measurement data acquired from the MFP 3 is the initial data (YES in ACT 32), the processor 21 determines whether the collection of the initial data from the MFP 3 is completed (ACT 33). For example, the server 2 needs to acquire the measurement data for a predetermined set amount (a predetermined number of times or a predetermined period) as initial data considering variations that occur during the measurement in the MFP 3. If initial data for the predetermined set amount is already acquired, the processor 21 determines that the collection of the initial data is completed.

If it is determined that the collection of the initial data is not completed (NO in ACT 33), the processor 21 ends a series of processing for the acquired measurement data, and continuously executes the collection of the initial data.

If it is determined that the collection of the initial data is completed (NO in ACT 33), the processor 21 calculates the monitoring start condition based on the initial data acquired as the initial data from the MFP 3 (ACT 34). For example, the processor 21 may determine the monitoring start condition by comparing the initial data collected from the target MFP 3 with the initial data acquired from other equipment in the past. The processor 21 may calculate the monitoring start condition from an analysis result such as the relationship between the initial data collected from other MFPs in the past and a failure status actually generated in the polygon motor.

The monitoring start condition may be calculated as a threshold value for the data calculated from the measurement data. For example, the monitoring start condition may be set to a case where the deviation (change amount) with respect to the initial data of the measurement data exceeds a predetermined threshold value. The predetermined threshold value may be a numerical value or a ratio of deviation to the initial data.

If the monitoring start condition is calculated, the processor 21 sets the monitoring start condition for the MFP 3 which is the transmission source of the initial data (ACT 35). For example, the processor 21 transmits the monitoring start condition to the MFP 3 via the communication interface 25. The processor 141 of the MFP 3 stores the monitoring start information supplied from the server 2 by the communication interface 145 in the auxiliary storage device 144.

If the measurement data acquired from the MFP 3 is not the initial data (NO in ACT 32), the processor 21 stores the measurement data acquired from the MFP 3 in the auxiliary storage device 144 as data for failure prediction. After storing the acquired measurement data, the processor 21 analyzes the measurement data acquired from the target MFP 3 (ACT 36). For example, the processor 21 determines whether a component (for example, a polygon motor) targeted for failure prediction deteriorates over time based on a change in measurement data acquired from the target MFP 3. The processor 21 may determine the deterioration over time by comparing the change pattern of the measurement data acquired from the target MFP 3 with the change pattern of the measurement data in other MFPs in the past.

If it is not determined that the deterioration over time occurs (NO in ACT 37), the processor 21 ends a series of processing for the acquired measurement data, and continuously executes the collection of the measurement data from the MFP 3.

If it is determined that the deterioration over time occurs (YES in ACT 37), the processor 21 generates a notification of the deterioration over time (ACT 38). For example, the processor 21 displays a warning on the operation panel of the target MFP 3 that the component targeted for failure prediction deteriorates over time. The processor 21 may notify a predetermined notification destination of the deterioration over time of the component.

As described above, the server according to at least one embodiment sets the monitoring start condition for starting the monitoring of failure prediction in the MFP based on the initial data on the component acquired from the MFP. The server accumulates the measurement data acquired from the image forming apparatus after the monitoring start condition is satisfied. The server predicts the failure of the component in the image forming apparatus based on the accumulated measurement data.

With such configuration, the server can set the condition for starting the monitoring of the component from the initial data acquired from the MFP, and can start the failure prediction according to characteristics unique to the component. The server can analyze the characteristics unique to the component in the image forming apparatus and accurately predict the failure of the component due to the deterioration over time.

In at least one embodiment described above, the case where the component targeted for failure prediction is a polygon motor is mainly described. However, the component targeted for failure prediction is not limited to the polygon motor, and may be other components. For example, the heater lamp or the like that configures the heating unit of the fixing device in the MFP 3 may be targeted for failure prediction. The MFP 3 acquires measurement data indicating a heating status of the heater lamp and supplies the measurement data to the server. With such configuration, the server may set the monitoring start condition for the heating unit from the measurement data indicating the heating status by the heater lamp, and determine the deterioration over time or the like based on the measurement data.

While certain embodiments have been described, these embodiments have been presented by way of example only, and are not intended to limit the scope of the invention. Indeed, the novel embodiments described herein may be embodied in a variety of other forms. Furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A failure prediction server comprising:
- an interface configured to communicate with equipment comprising a component targeted for failure prediction;
- a memory configured to store measurement data acquired from the equipment; and
- a processor configured to:
  - set a monitoring start condition for failure prediction in the corresponding equipment based on the measurement data acquired as initial data from the equipment,
  - accumulate the measurement data acquired from the equipment in the memory after the monitoring start condition is satisfied, and
  - predict a failure of the component based on the measurement data stored in the memory;
- wherein the equipment is an image forming apparatus;
- wherein the component is a motor, and the measurement data is data indicating a driving state of the motor; and
- wherein the measurement data is data indicating the time until the motor reaches a normal rotation.

2. The server of claim 1, wherein the memory stores the monitoring start condition for the component targeted for the failure prediction.

3. The server of claim 1, wherein the processor is further configured to:
- transmit the initial data back to the equipment.

4. The server of claim 3, wherein the initial data is data indicating an acting state of the component.

5. The server of claim 1, wherein the processor is further configured to:
- determine the monitoring start condition by comparing the initial data with initial data acquired from other devices in the past.

6. A failure prediction server comprising:
- an interface configured to communicate with equipment comprising a component targeted for failure prediction;
- a memory configured to store measurement data acquired from the equipment; and
- a processor configured to:
  - set a monitoring start condition for failure prediction in the corresponding equipment based on the measurement data acquired as initial data from the equipment,
  - accumulate the measurement data acquired from the equipment in the memory after the monitoring start condition is satisfied, and
  - predict a failure of the component based on the measurement data stored in the memory;
- wherein the equipment is an image forming apparatus;
- wherein the component is a motor, and the measurement data is data indicating a driving state of the motor; and
- wherein the measurement data is data indicating rotational stability of the motor.

7. The server of claim 6, wherein the memory stores the monitoring start condition for the component targeted for the failure prediction.

8. The server of claim 6, wherein the processor is further configured to:
- transmit the initial data back to the equipment.

9. The server of claim 8, wherein the initial data is data indicating an acting state of the component.

10. The server of claim 6, wherein the processor is further configured to:
- determine the monitoring start condition by comparing the initial data with initial data acquired from other devices in the past.

11. A method for failure prediction, the method comprising:
- communicating with equipment comprising a component targeted for failure prediction;
- storing measurement data acquired from the equipment;

setting a monitoring start condition for failure prediction in the corresponding equipment based on the measurement data acquired as initial data from the component;

accumulating the measurement data acquired from the equipment after the monitoring start condition is satisfied;

predicting a failure of the component based on the measurement data; and determining deterioration over time of the component by comparing a change pattern of measurement data acquired from the equipment with a change pattern of measurement data acquired from other devices in the past.

12. The method of claim 11, further comprising storing the set monitoring start condition for the component targeted for failure prediction.

13. The method of claim 11, further comprising transmitting initial data back to the equipment.

14. The method of claim 13, wherein the initial data is data indicating an acting state of the component.

15. The method of claim 11, wherein the equipment is an image forming apparatus.

16. The method of claim 15, wherein the component is a motor, and the measurement data is data indicating a driving state of the motor.

17. The method of claim 11, wherein the measurement data is data indicating the time until the motor reaches a normal rotation.

18. The method of claim 11, wherein the measurement data is data indicating rotational stability of the motor.

19. The method of claim 11, further comprising determining the monitoring start condition by comparing the initial data with initial data acquired from other devices in the past.

20. The method of claim 19, wherein the start condition is based on the relationship between the initial data acquired from other devices in the past and a failure status generated by a motor.

* * * * *